United States Patent
Udell et al.

[11] Patent Number: 6,030,161
[45] Date of Patent: Feb. 29, 2000

[54] SLEEVE AND CAPTIVE BOLT ASSEMBLY

[75] Inventors: Mark A. Udell, Wytheville; Roger K. Rich, Rural Retreat, both of Va.

[73] Assignee: Textron, Inc., Providence, R.I.

[21] Appl. No.: 09/103,010

[22] Filed: Jun. 23, 1998

[51] Int. Cl.$^7$ ..................................... F16B 21/18
[52] U.S. Cl. ............................ 411/353; 411/533; 411/999
[58] Field of Search ........................... 411/353, 352, 411/107, 533, 970, 999

[56] References Cited

U.S. PATENT DOCUMENTS

| | | | |
|---|---|---|---|
| 3,126,935 | 3/1964 | Tuozzo | 411/352 |
| 3,156,281 | 11/1964 | Demi | 411/107 |
| 3,250,539 | 5/1966 | Sommerfeld | 411/352 |
| 3,255,799 | 6/1966 | Heimovics | 411/999 |
| 3,556,570 | 1/1971 | Cosenza . | |
| 3,571,904 | 3/1971 | Gulistan | 411/999 |
| 3,687,184 | 8/1972 | Wagner . | |
| 3,777,796 | 12/1973 | Takano . | |
| 3,869,219 | 3/1975 | Wilson et al. . | |
| 4,193,434 | 3/1980 | Wagner . | |
| 4,238,165 | 12/1980 | Wagner . | |
| 4,334,599 | 6/1982 | Ritsema et al. . | |
| 4,435,112 | 3/1984 | Becker . | |
| 4,621,961 | 11/1986 | Gulistan . | |
| 4,732,519 | 3/1988 | Wagner . | |
| 4,975,008 | 12/1990 | Wagner . | |
| 5,328,311 | 7/1994 | Knohl . | |
| 5,489,177 | 2/1996 | Schmidt, Jr. . | |
| 5,577,854 | 11/1996 | Jacob et al. . | |
| 5,807,052 | 9/1998 | Van Boven et al. . | |

OTHER PUBLICATIONS

Die Schraube, Die Schon Vorher Hält.
A drawing of a design offered for sale in 1989 (labeled "GNI–89–165").
A drawing of a design offered for sale in 1992 (labeled "Design Proposal for General Fasteners").

*Primary Examiner*—Flemming Saether
*Attorney, Agent, or Firm*—Trexler, Bushnell, Giangiorgi & Blackstone, Ltd.

[57] ABSTRACT

Disclosed is a fastener which includes a sleeve having an outwardly extending flange at a first end. A bolt extends in the sleeve and is axially moveable therein. A collar has a retaining portion which is engaged with a second end of the sleeve and the collar provides an outwardly extending flange adjacent the second end of the sleeve. The retaining portion of the collar prevents removal of the bolt from the sleeve when the bolt is at least partially axially withdrawn from the sleeve toward the collar. The retaining portion thereby retains the bolt in an axially displaceable, captive relation to the sleeve.

8 Claims, 4 Drawing Sheets

SLEEVE AND CAPTIVE BOLT ASSEMBLY

BACKGROUND

In some situations, it is desirable to mount a first workpiece to a second workpiece using a fastener where the fastener provides for a pre-determined stand-off from the second workpiece. Such an application is when certain automobile components are to be mounted. Many fasteners which provide a stand-off can be found in the prior art, such as in U.S. Pat. Nos. 4,732,519, 5,489,177 and 5,577,854.

As shown in the above-identified references, it is common to utilize a sleeve to stand-off a head portion of a bolt from a workpiece. However, these types of fasteners often provide that the sleeve and bolt can readily separate from each other before the assembly is used.

Fasteners are often used on manufacturing assembly lines and such where many different types of fasteners are routinely used. Therefore, the fact that a bolt and a sleeve assembly can readily disassemble proves to be a significant inconvenience. Additionally, because the bolt can readily separate from the sleeve, the sleeve is typically initially inserted in an aperture in a workpiece, and then, in a secondary operation, the bolt is inserted in the sleeve before the bolt is threadably engaged into a second workpiece.

OBJECTS AND SUMMARY

It is an object of the present invention to provide a fastener which provides a stand-off when the fastener is engaged with a workpiece.

It is a further object of the present invention to provide a fastener where a bolt cannot be readily fully withdrawn from a sleeve upon axial movement of the bolt in relation to the sleeve.

It is a yet further object of e present invention to provide a fastener which provides that a bolt is held in captive relation to a sleeve.

A still further object of the present invention may be to provide a fastener which includes a grommet that all for thermal expansion or contraction of the joint.

In accordance with these and other objects, the present invention provides a fastener which includes a sleeve having an outwardly extending flange at a first end. A bolt extends in the sleeve and is axially moveable therein. A collar includes a retaining portion engaged with a second end of the sleeve, and the collar provides an outwardly extending flange adjacent the second end of the sleeve. The retaining portion of the collar prevents removal of the bolt from the sleeve when the bolt is at least partially axially withdrawn from the sleeve toward the collar. The retaining portion thereby retains the bolt in an axially displaceable, captive relation to the sleeve.

BRIEF DESCRIPTION OF THE DRAWINGS

The present invention and the advantages thereof will become more apparent upon consideration of the following detailed description when taken in conjunction with the accompanying drawings of which.

DESCRIPTION

Figure 1:
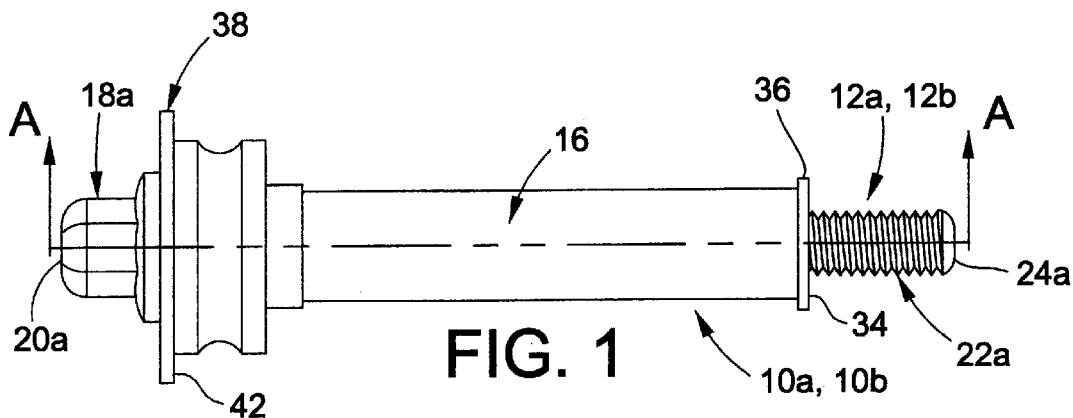
FIG. 1 is a top, plan view of a fastener in accordance with the present invention.

While the present invention may be susceptible to embodiment in different forms, there is shown in the drawings, and herein will be described in detail, embodiments of the invention with the understanding that the present description is to be considered an exemplification of the principles of the invention and is not intended to limit the invention to that as illustrated and described herein.

Figure 2:
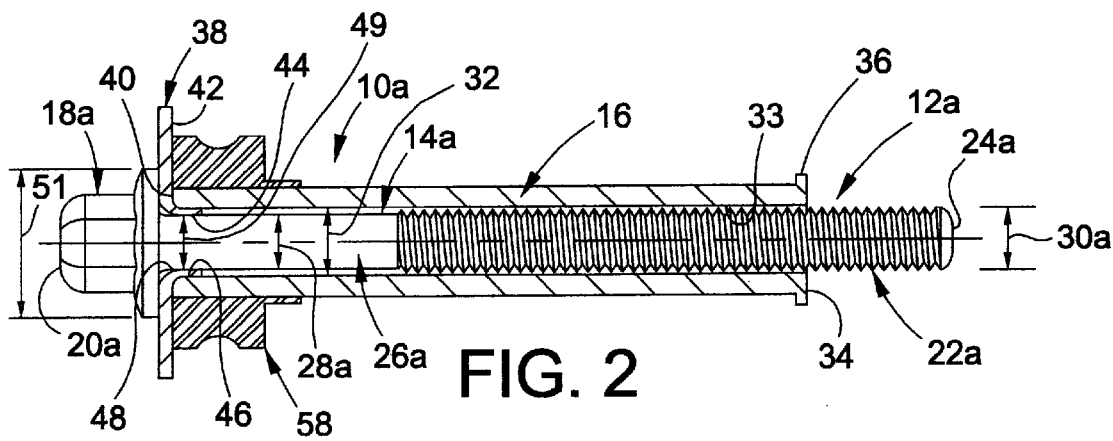
FIG. 2 is a partial cross-sectional view, along line A—A, of the fastener shown in FIG. 1, showing a bolt in accordance with a first embodiment of the present invention.
Figure 3:
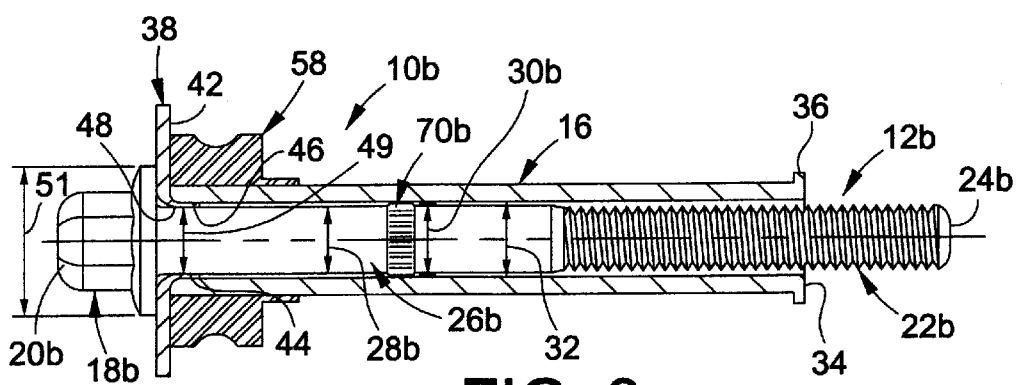
FIG. 3 is a partial cross-sectional view, along line A—A, of the fastener shown in FIG. 1, showing a bolt in accordance with a second embodiment of the present invention.

Shown in FIG. 1 is a fastener 10a, 10b which is in accordance with the present invention. FIG. 2 is a partial cross-sectional view, taken along line A—A in FIG. 1, of the fastener 10a in the case where a bolt component 12a of the fastener 10a is provided in accordance with a first embodiment of the present invention. In contrast, FIG. 3 is a partial cross-sectional view, taken along line A—A in FIG. 1, of the fastener 10b in the case where a bolt component 12b of the fastener 10b is provided in accordance with a second embodiment of the present invention.

First, the fastener 10a in accordance with the first embodiment will be described, then the fastener 10b in accordance with the second embodiment will be described. Therefore, FIGS. 1 and 2 should be initially viewed while reading the following description of the first embodiment.

As shown in FIG. 2, the fastener 10a includes a bolt 12a having a shank portion 14a inserted in a sleeve 16. The bolt 12a preferably has a head portion 18a at a first end 20a of the bolt 12a, and has a threaded portion 22a at a second, opposite end 24a of the bolt 12a. Between the head portion 18a and the threaded portion 22a is a non-threaded portion 26a which is a reduced diameter portion. Both the non-threaded portion 26a and the threaded portion 22a of the bolt 12a have diameters, 28a and 30a, respectively, which are less than an inside diameter 32 of the sleeve 16. This provides that the shank portion 14a of the bolt 12a, which includes both the threaded and unthreaded portions 22a and 26a, are insertable and axially displaceable within the sleeve 16.

The sleeve 16 is generally cylindrical with an axial throughbore 33 which receives the shank portion 14a of the bolt 12a. Preferably, the sleeve 16 is formed from wire as opposed to being an extruded tube. However, it is anticipated that the sleeve 16 may, in fact, be an extruded tube, and such would be within the scope of the present invention.

As shown, the shank portion 14a of the bolt 12a is provided as being longer than the sleeve 16, thus the threaded portion 26a of the bolt 12a is extendible out a first end 34 of the sleeve 16. The first end 34 of the sleeve 16 prefer provides an outwardly extending flange 36 for contacting a workpiece, as will be described later herein. Alternatively, the sleeve 16 may have a generally uniform outside diameter which is generally equivalent to the diameter of the flange 36 shown. In other words, the sleeve 16 may be provided in a shape which renders providing the flange 36 unnecessary.

A collar 38 is retained in the sleeve 16 at a second end 40 of the sleeve 16. The collar 38 may be provided in the form of a washer which provides a radially extending flange 42 adjacent the second end 40 of the sleeve 16 as well as a retaining portion 44 which is received in the second end 40 of the sleeve 16. More specifically, the retaining portion 44 of the collar 38 engages with an internal surface 46 of the sleeve 16 at the end 40 of the sleeve 16. The retaining portion 44 of the collar 38 may comprise a depending flange or skirt which is inserted into the end 40 of the sleeve 16. Preferably, the retaining portion 44 of the collar 38 is frictionally engaged or otherwise attached to the internal surface 46 of the sleeve 16 such that the collar 38 cannot be readily removed from the end 40 of the sleeve 16. To this end, preferably a nominal outside diameter of the retaining portion 44 can be provided as being slightly larger than the inside diameter 32 of the sleeve 16 such that a press fit is formed between the collar 38 and the sleeve 16. Preferably, the press fit between the collar 38 and sleeve 16 is such that the press fit is maintained even though a reasonable amount of force is applied in an attempt to separate the collar 38 from the sleeve 16. Moreover, the collar 38 and sleeve 16 may be adhered together, and this adhesive engagement may replace or augment the friction fit between the collar 38 and sleeve 16.

The collar 38 includes an c opening 48 having an internal diameter 49 through which the shank portion 14a of the bolt 12a is received. The head portion 18a of the bolt 12a has a diameter 51 which is larger than the diameter 49 of opening 48 in the collar 38. Therefore, the bolt 12a cannot axially displace fully past the collar 38 into the sleeve 16 and is prevented from doing so by abutment between the head portion 18a of the bolt 12a and the surface of the collar 38. The diameter 28a of the non-threaded portion 26a of the bolt 12a is smaller than the diameter 49 of the opening 48 in the collar 38. Therefore, the bolt 12a can axially displace within the sleeve 16.

Figure 4:
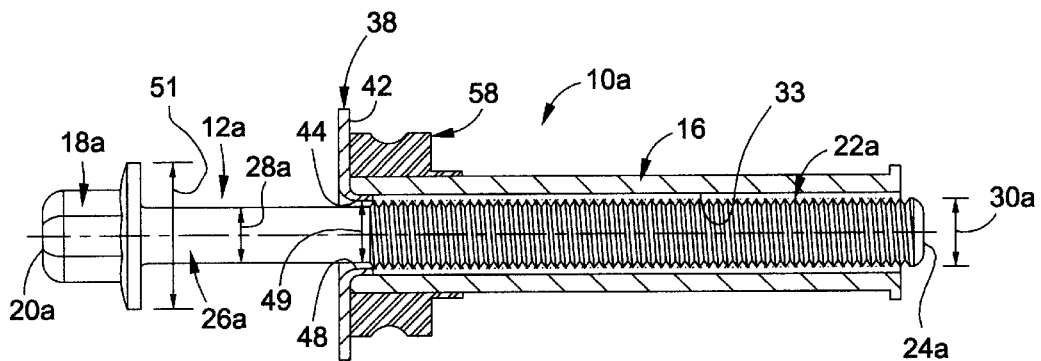
FIG. 4 is a view similar to that of FIG. 2 showing the bolt axially displaced, but captively retained in a sleeve.

However, in accordance with the first embodiment, the diameter 30a of the threaded portion 22a of the bolt 12a defines an increased diameter portion having a diameter 30a which is larger than the diameter 49 of the opening 46 in the collar 38. Therefore, when the bolt 12a is at least partially axially withdrawn from the sleeve 16, the threaded portion 22a of the bolt 12a abuts the retaining portion 44 of the collar 38 as shown in FIG. 4. This resulting abutment between the collar 38 and the threaded portion 44 of the bolt 12a provides that the bolt 12a cannot be fully removed from the sleeve 16 when the bolt 12a is axially displaced in the sleeve 16 toward the collar 38. In this manner, the bolt 12a is captively retained in the sleeve 16, yet the bolt 12a is axially displaceable therein. Specifically, abutment between the retaining portion 44 of the collar 38 and the threaded portion 22a of the bolt 12a, as shown in FIG. 4, limits axial travel of the bolt 12a within the sleeve 16 in one direction. Abutment between the head portion 18a of the bolt 12a and the surface of the collar 38, as shown in FIG. 2, limits axial travel of the bolt 12a within the sleeve 16 in the other direction.

A grommet 58 such as a compressible silicone grommet may be positioned on the sleeve 16, in contact with the collar 38. The grommet 58 functions to provide a seal when the fastener 10a is engaged with a workpiece, and allows for thermal expansion or contraction of the joint. The grommet 58 preferably provides clamp, take-up from both thermal expansion and contraction as well as mechanical expansion (i.e. creep of plastic).

Figure 6:
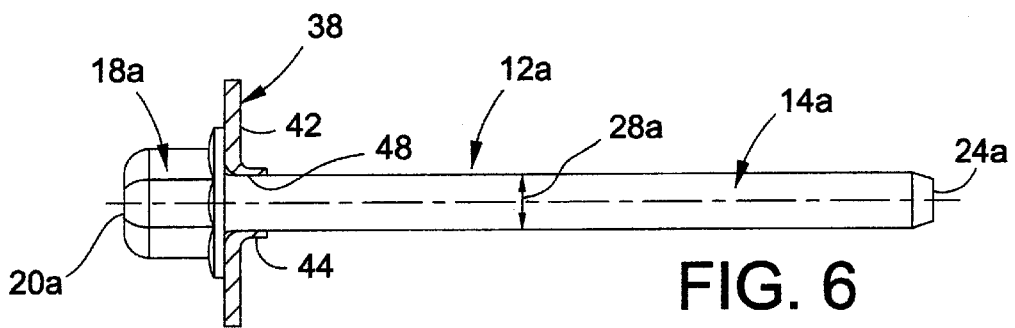
FIG. 6 is a top, plan view of an unthreaded blank extending through a collar.
Figure 7:
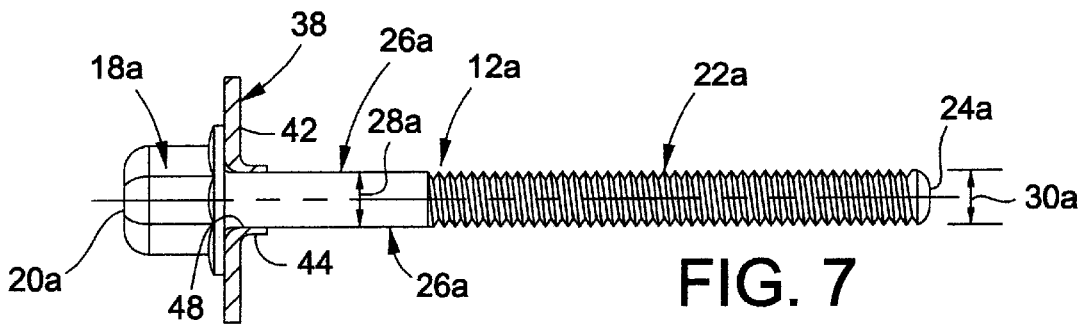
FIG. 7 is a top, plan view of the bolt and collar of FIG. 6 after threads have been formed on the blank to provide a threaded bolt.

One method of producing fastener 10a will now be described with reference to FIGS. 2 and 6–10. First, the shank portion 14a of the bolt 12a is inserted into the collar 38 such that the collar 38 contacts the head portion 18a, as shown in FIG. 6. One having ordinary skill in the art would recognize that the bolt as shown in FIG. 6 would perhaps be more accurately referred to as being a "blank" at this point in the assembly process as the part does not yet have threads formed thereon. The threads will be formed in the next step as explained below. The collar 38 is positioned on the blank on what will be the non-threaded portion 26a of the bolt 12a. Then, threads, as shown in FIG. 7, are rolled onto the bolt 12a to provide the threaded portion 22a. A thread sealant may be applied to the threads.

Figure 9:
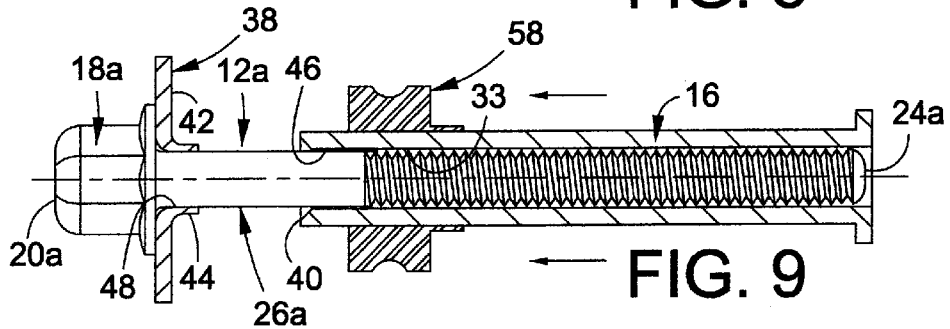
FIG. 9 is a top, plan view of a sleeve receiving the threaded bolt of FIG. 7.
Figure 10:
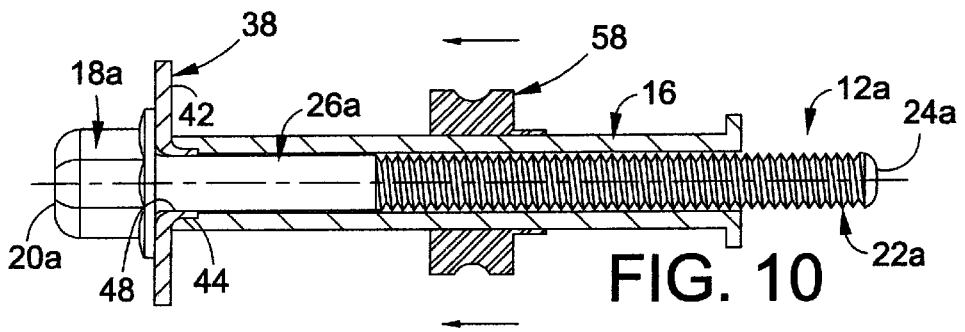
FIG. 10 is a top, plan view of the sleeve engaged with the collar.

After the threaded portion 22a is formed, the shank portion 14a of the bolt 12a is inserted into the throughbore 33 of the sleeve 16, as shown in FIG. 9, such that the end 40 of the sleeve 16 engages the retaining portion 44 of the collar 38, as shown in FIG. 10. As mentioned, preferably a nominal outside diameter of the retaining portion 44 is provided as being slightly larger than the inside diameter 32 of the sleeve 16 such that a press fit is formed between the collar 38 and the sleeve 16 when the two components engage. Preferably, the press fit between the collar 38 and sleeve 16 is such that the fit is maintained even though a reasonable amount of force is applied in an attempt to separate the collar 38 from the sleeve 16. The retaining portion 44 of the collar 38 may be shaped or formed, such as by knurling, to further facilitate the press fit. As mentioned, an adhesive engagement can be provided between the collar 38 and sleeve 16 in addition to, or as an alternative to, the press fit. Either before of after the sleeve 16 is engaged with the retaining portion 44 of the collar 38, the grommet 58 can be positioned on the sleeve 16, as shown in FIGS. 9 and 10. Then, the grommet 58 may be moved into contact with the collar 38 such that the resulting fastener 10a appears as shown in FIGS. 1 and 2.

Figure 8:
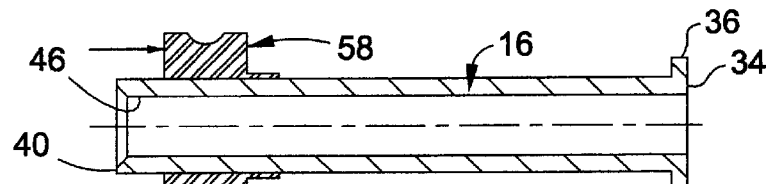
FIG. 8 is a plan view showing a grommet positioned on a sleeve.

As mentioned, the grommet 58 can be positioned on the sleeve 16 either before or after the sleeve 16 is engaged with the collar 38. However, it is preferred that the grommet 58 be positioned on the sleeve 16 by moving the grommet 58 over end 40 of the sleeve 16 before the sleeve 16 is engaged with the collar 38. This is illustrated in FIG. 8. By not having to move the grommet 58 past the flange 36 (if provided) at the other end 34 of the sleeve 16 during assembly, the grommet 58 can be selected from materials which would provide insufficient resiliency as would be needed to clear the flange 36 during assembly. In other words, engaging the grommet 58 with the sleeve 16 from the end 40 of the sleeve 16 not having the flange 36 provides that a wider range of materials and resiliencies can be selected for the grommet 58.

Figure 11:
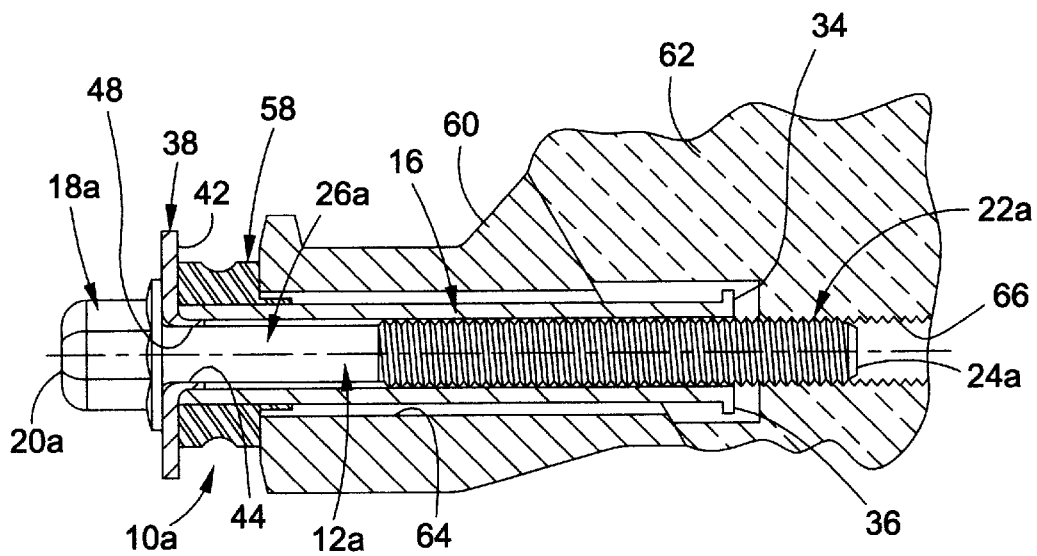
FIG. 11 is a partial cross-sectional view showing the fastener of FIG. 2 being used to mount one workpiece to another workpiece.
Figure 12:
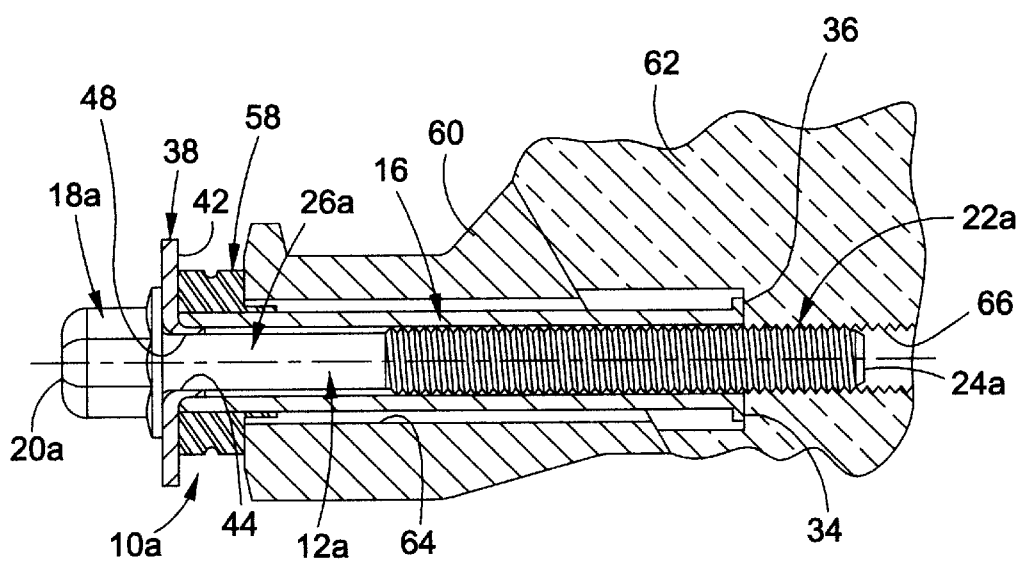
FIG. 12 is a view similar to that of FIG. 11 showing the fastener fully engaged thereby mounting the two workpieces together.

The fastener 10a may be utilized to fasten a first workpiece 60 to a second workpiece 62, and this will now be described with reference to FIGS. 11 and 12. As shown in FIG. 11, the fastener 10a is initially inserted into an aperture 64 in the first workpiece 60. Because the bolt 12a is captively retained in the sleeve 16, only the head portion 18a of the bolt 12a need be used to initially position the sleeve 16 in the aperture 64 in the first workpiece 60. This is because the sleeve 16 is prevented from separating from the bolt 12a while the head portion 18a is used to guide the fastener 10a, and more specifically the sleeve 16 thereof, into the aperture 64. Then, the threaded portion 26a of the bolt 12a is engaged with a threaded bore 66 in the second workpiece 62. This threaded engagement is facilitated by rotating the head portion 18a of the bolt 12a after inserting the sleeve 16 in the aperture 64 in the first workpiece 60, and after axially displacing the bolt 2a toward the second workpiece 62 such that the threaded portion 22a of the colt 12a initially contacts the threaded bore 66. Preferably, the head portion 18a of the bolt 12a is shaped such that it can readily be engaged with a tool to facilitate rotation of the bolt 12a.

FIG. 11 depicts the fastener 10a after the bolt 12a has been partially threaded into the workpiece 62. As shown in FIG. 12, continued thread engagement draws the first end 36 of the sleeve 16 against the second workpiece 62 and causes the grommet 58 to compress between the collar 38 and the first workpiece 60. As the bolt 12a is further threaded into the threaded bore 66, the flange 36 at the end 34 of the sleeve 16 contacts the workpiece 62 preventing any further threading of the bolt 12a into the workpiece 62 thereby creating a stand-off. When bolt 12a has been fully threaded into the bore 66, the grommet 58 on the sleeve 16 is compressed between the workpiece 60 and the collar 38 of the fastener 10a thereby forming a sea and allowing for expansion and contraction, as described hereinabove.

As mentioned, FIG. 3 is a cross-sectional view of the fastener 10b shown in FIG. 1 in the case where the bolt component 12b thereof is provided in accordance with a second embodiment. Because many of the components of fastener 10b are the same as fastener 10a, only the differences between the two will now be discussed and identical reference numbers will be used for identical parts and description thereof omitted with the understanding that one may review the description relating to fastener 10a to obtain an understanding of fastener 10b.

As shown in FIG. 3, the fastener 10b also includes a bolt 12b, a collar 38, a sleeve 16, and possibly a grommet 58. In fact, the components of fastener 10b may be identical to that of fastener 10a, but for a difference in the structure of the bolt 12b. As mentioned above, the bolt 12a of fastener 10a includes a threaded portion 22a which defines an increased diameter portion in that it has a diameter 30a which is greater than the size of the opening 48 in the collar 38. Thus, the bolt 12a is axially displaceable within the sleeve 16, but is captively retained therein. The bolt 12a is captively retained in the sleeve 16 because when the bolt 12a is axially withdrawn from the sleeve 16, the threaded portion 22a of the bolt 12a abuts the retaining portion 44 of the collar 38, as shown in FIG. 4, thereby preventing the bolt 12a from being withdrawn any further from the sleeve 16.

The bolt 12b of fastener 10b also includes an increased diameter portion in the form of a knurled circumferential portion 70b which has a diameter 30b which is greater than the diameter 49 of the opening 48 in the collar 36. Both the diameters of the knurled circumferential portion 70b and the threaded portion 22b of the bolt 12b are less than an inside diameter 32 of the sleeve 16. Additionally, the bolt 12b includes a head portion 18b which has a diameter 51 which is greater than the diameter 49 of the opening 48 in the collar 38. Thus, the bolt 12b of fastener 10b, like the bolt 12a of fastener 10a, is axially displaceable within the sleeve 16, but is captively retained therein.

Figure 5:
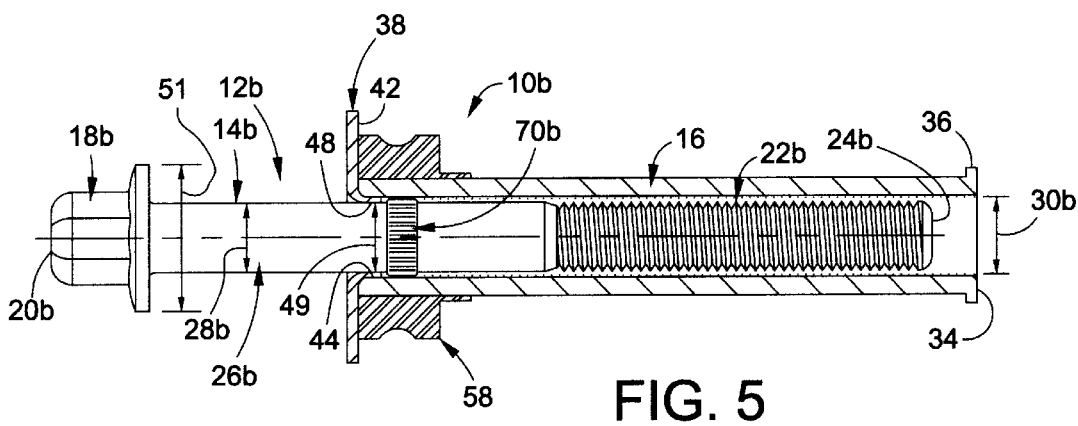
FIG. 5 is a view similar to that of FIG. 3 showing the bolt axially displaced, but captively retained in a sleeve.

The bolt 12b is captively retained in the sleeve 16 because when the bolt 12b is axially withdrawn from the sleeve 16, the knurled circumferential portion 70b of the bolt 12b abuts the retain ing portion 44 of the collar 38 as shown in FIG. 5. This resulting abutment between the collar 38 and the knurled circumferential portion 70b of the bolt 12b provides that the bolt 12b cannot be fully removed from the sleeve 16 then the bolt 12b is axially withdrawn from the sleeve 16 toward the collar 38. Also, abutment between the head portion 18b of the bolt 12b and the surface of the collar 16, as shown in FIG. 3, limits axial travel of the bolt 12b within the sleeve 16 in the other direction.

With regard to making fastener 10b, the same steps can be performed as discussed above with relation to fastener 10a (FIGS. 6–10), with the knurled circumferential portion 70b of bolt 12b being formed on the bolt 12b simultaneously with the threaded portion 22b.

With regard to operation, fastener 10b can be used in the same manner as fastener 10a to mount one workpiece to another.

As discussed, both fasteners 10a, 10b provide that the bolt 12a, 12b is axially displaceable, yet is captively retained in the sleeve 16. Both fasteners 10a, 10b produce this result by providing the retaining portion 44 of the collar 38 which abuts an increased diameter portion of the bolt 12a, 12b when the bolt 12a, 12b is axially withdrawn from the sleeve 16 in the direction of the collar 38. This captive, yet axially displaceable relationship between the sleeve 16 and bolt 12a, 12b provides that the two components do not readily disassemble from each other.

While embodiments of the present invention are shown and described, it is envisioned that those skilled in the art may devise various modifications of the present invention without depart ing from the spirit and scope of the appended claims.

What is claimed is:

1. A fastener assembly engageable with a workpiece, said fastener assembly comprising: a sleeve; a bolt having a threaded portion, said bolt extending in said sleeve and axially moveable therein; a collar providing an outwardly extending flange adjacent an end of said sleeve and having a retaining portion engaged within said end of said sleeve to provide abutment, said retaining portion of said collar preventing removal of said bolt from said sleeve when said bolt is at least partially axially withdrawn from said sleeve toward said collar, said retaining portion thereby retaining said bolt in an axially displaceable, captive relation to said sleeve, said collar being retained in captive relation to said sleeve; and a grommet disposed on said sleeve such that said grommet engages said outwardly extending flange of said collar and said workpiece when said fastener is engaged with said workpiece.

2. A fastener assembly as recited in claim 1, said bolt including an increased diameter portion, said retaining portion of said collar having a diameter which is less than said increased diameter portion of said bolt, said increased diameter portion of said bolt abutting said retaining portion when said bolt is at least partially axially withdrawn from said sleeve, said abutment between said increased diameter portion of sail bolt and said retaining portion of said collar providing that said bolt is retained in an axially displaceable, captive relation to said sleeve.

3. A fastener assembly as recited in claim 2, said threaded portion of said bolt having a diameter, said retaining portion of said collar having a diameter, said diameter of said retaining portion of said collar being less than said diameter of said threaded portion of said boat, said threaded portion of said bolt abutting said retaining portion of said collar when said bolt is at least partially axially withdrawn from said sleeve, said abutment between said threaded portion of said bolt and said retaining portion of said collar providing that said bolt is retained in an axially displaceable, captive relation to said sleeve.

4. A fastener assembly as recited in claim 2, said bolt including a knurled circumferential portion having a diameter, said retaining portion of said collar having a diameter, said diameter of said retaining portion of said collar being less than said diameter of said knurled circumferential portion of said bolt, said knurled circumferential portion of said bolt abutting said retaining portion of said collar when said bolt is at least partially axially withdrawn from said sleeve, said abutment between said knurled circumferential portion of said bolt and said retaining portion of said collar member providing that said bolt is retained in an axially displaceable, captive relation to said sleeve.

5. A fastener assembly as recited in claim 1, said bolt including a head portion contactably engageable against said collar.

6. A fastener assembly as recited in claim 1, said sleeve having an outwardly extending flange at an end thereof opposite said end of said sleeve with which said collar is engaged.

7. A fastener as recited in claim 1, wherein said end of said sleeve with which said retaining portion of said collar is engaged does not provide an inwardly facing flange.

8. A freestanding fastener assembly engageable with a workpiece, said freestanding fastener assembly comprising: a sleeve having a first end and a second end; a bolt having a threaded portion, said bolt extending in said sleeve and axially moveable therein; a collar providing an outwardly extending flange adjacent said first end of said sleeve and having a retaining portion engaged within said first end of sad sleeve to provide an abutment, said second end of said sleeve being generally freestanding in that said second end of said sleeve is not engaged with the workpiece, but is engageable therewith, said retaining portion of said collar preventing removal of said bolt from said sleeve when said bolt is at least partially axially withdrawn from said sleeve toward said collar, said retaining portion thereby retaining said bolt in an axially displaceable, captive relation to said sleeve, said collar being retained in captive relation to said sleeve, further comprising a grommet disposed on said sleeve such that said grommet engages said outwardly extending flange of said collar and said workpiece when said fastener is engaged with said workpiece.

* * * * *

UNITED STATES PATENT AND TRADEMARK OFFICE
CERTIFICATE OF CORRECTION

PATENT NO. : 6,030,161
DATED : February 29, 2000
INVENTOR(S) : Mark A. Udell and Roger K. Rich It is certified that error appears in the above-identified patent and that said Letters Patent is hereby corrected as shown below:

Column 1, Line 35 "of e" should be -- of the --
Column 1, Line 39 "that all" should be -- allows --
Column 3, Line 4 "prefer" should be -- preferably --
Column 3, Line 35 "an c opening" should be -- an opening --
Column 5, Line 9 "bolt 2a" should be -- bolt 12a --
Column 5, Line 10 "colt" should be -- bolt --
Column 6, Line 58 "sail" should be -- said --
Column 6, Line 65 "boat" should be -- bolt --

Signed and Sealed this

Twentieth Day of February, 2001

Attest:

NICHOLAS P. GODICI

Attesting Officer

Acting Director of the United States Patent and Trademark Office